United States Patent [19]
Schmitt

[11] Patent Number: 5,815,549
[45] Date of Patent: Sep. 29, 1998

[54] CATAPULT RASTER DRAWER FOR A RADIOLOGICAL EXAMINATION SYSTEM

[75] Inventor: Thomas Schmitt, Forchheim, Germany

[73] Assignee: Siemens Aktiengesellschaft, Munich, Germany

[21] Appl. No.: 902,216

[22] Filed: Jul. 29, 1997

[30] Foreign Application Priority Data

Aug. 1, 1996 [DE] Germany ............... 196 31 144.6

[51] Int. Cl.[6] .................................................. G03B 42/02
[52] U.S. Cl. ............................................. 378/175; 378/181
[58] Field of Search ................................. 378/175, 167, 378/171, 172, 173, 174, 177, 181

[56] References Cited

U.S. PATENT DOCUMENTS

| | | | |
|---|---|---|---|
| 2,291,139 | 7/1942 | Borthwick | 378/181 X |
| 3,826,922 | 7/1974 | Ingles | 378/181 |
| 5,148,466 | 9/1992 | Fajac | 378/181 X |
| 5,530,734 | 6/1996 | Jeager | 378/181 |

OTHER PUBLICATIONS

Siemens Brochure for Streusstrahlenraster no date.

*Primary Examiner*—David P. Porta
*Attorney, Agent, or Firm*—Hill & Simpson

[57] ABSTRACT

Catapult raster drawer for an X-ray system has an insertion carriage on which two clamp jaws are arranged opposite one another, and which are biased so as to be resiliently displaceable relative to one another to hold the insertion side and the opposite side of a cassette in clamping fashion. Stop faces for two neighboring cassette sides are inclined at an angle relative to the insertion direction at at least one clamp side.

6 Claims, 1 Drawing Sheet

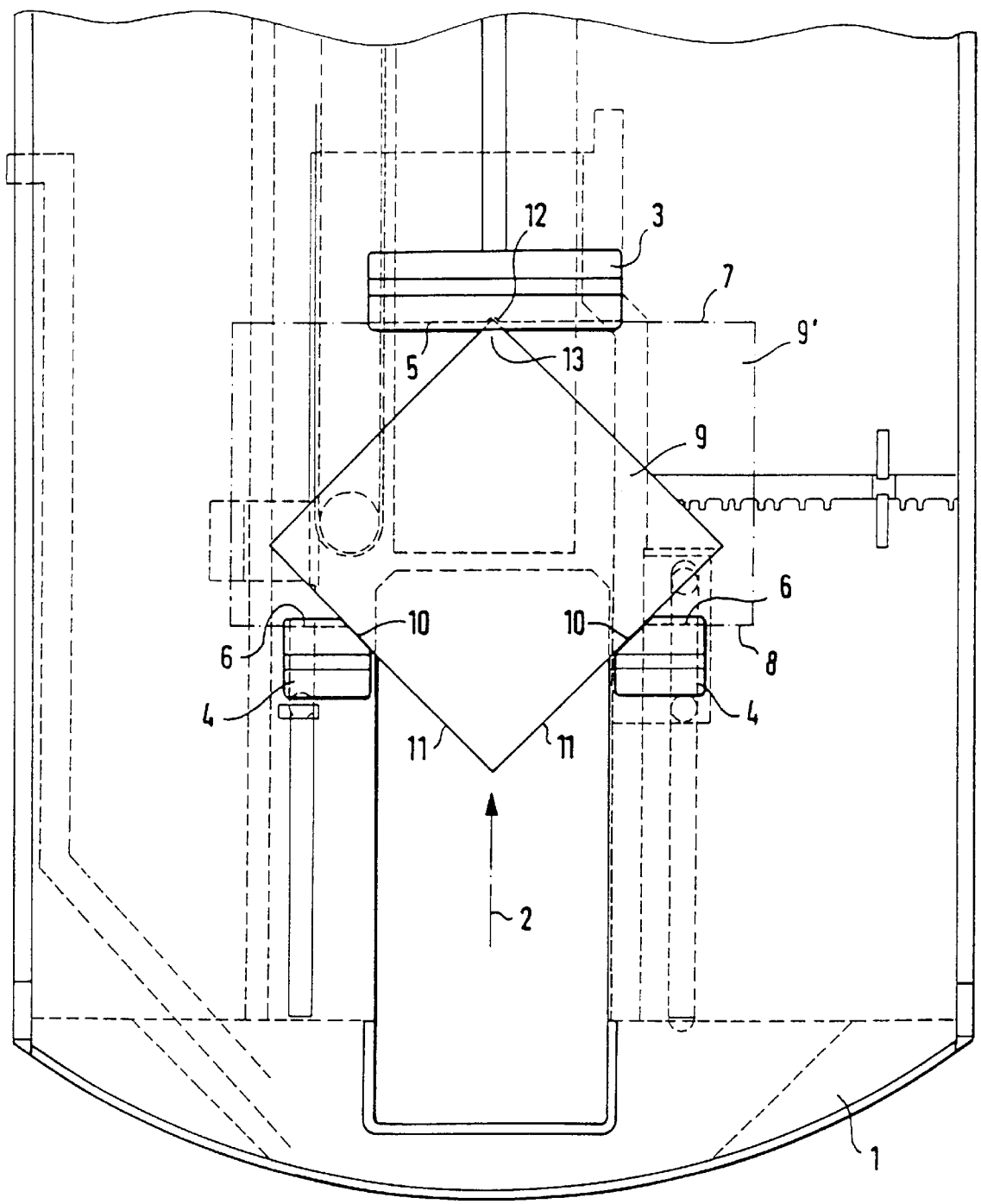

CATAPULT RASTER DRAWER FOR A RADIOLOGICAL EXAMINATION SYSTEM

BACKGROUND OF THE INVENTION

1. Field of the Invention

The present invention is directed to a catapult raster drawer for a radiological examination system, such as an X-ray system or the like, of the type having an insertion carriage on which at least two clamp jaws are arranged that reside opposite one another, and which are resiliently displaceable relative to one another so as to hold the insertion side and the opposite side of a cassette in clamping fashion.

2. Description of the Prior Art

Catapult raster drawers of the above type enable a very fast and reliable, centered holding of the image cassettes in X-ray systems. Usually, the back clamp jaw in the insertion direction is fashioned as a single clamp jaw, whereas the separate, rigid clamp jaws are mounted on the guide carriage at the opposite front side.

This proven design of a catapult raster drawer, however, only enables the mounting of the cassette in a predetermined direction, whereas it would be beneficial for a number of application purposes to hold the cassette in a turned position at the insertion carriage.

SUMMARY OF THE INVENTION

An object of the present invention is to provide a catapult raster drawer of the type initially described wherein the cassette, in addition to being able to be held in the standard insertion position, also can be optionally held in a position at the insertion carriage that is turned by an angle, particularly an angle of 45° relative to the standard position.

For achieving this object, the inventive catapult raster drawer has stop faces for two neighboring cassette sides that are arranged at at least one clamping side inclined by an angle, particularly an angle of 45°, relative to the insertion direction. In an embodiment of the invention, this capability is achieved by means of two clamp jaws disposed at one side of the drawer, preferably the front side, each having a stop face inclined by 45° relative to the insertion direction in addition to the usual clamp seating edge that is oriented perpendicularly relative to the longitudinal insertion direction.

As a result of the inventive structure, it is optionally possible—and without any added structural outlay and also without making mounting more complicated—to insert the cassette in a position turned by 45° relative to the normal mounting position and to hold it reliably clamped therein. When employed together with a raster having analogous rotatability up to the limit stops at the radiator, and thus allowing centering relative to the cassette in the catapult raster drawer, tomographic exposures at, for example, 45° or exposures with selectable declination and inclination are thus possible.

Even though the slanting clamp faces of the front clamp jaws suffice for the centered holding of the turned cassette, for providing further rigidity in holding the cassette another embodiment provides that the opposite, preferably the back, clamp jaw has a central recess for accepting a corner of the cassette. If this back clamp jaw is a resiliently displaceable clamp jaw, as is preferred, this enables a centered insertion of the cassette and, when this back clamp jaw is resiliently moved toward the cassette insertion opening, it comes to rest against the slanting surfaces of the front clamp jaws which are rigidly mounted on the insertion carriage.

DESCRIPTION OF THE DRAWINGS

The single figure is a plan view of a catapult raster drawer constructed in accordance with the principles of the present invention.

DESCRIPTION OF THE PREFERRED EMBODIMENTS

The inventive catapult raster drawer has a back clamp jaw 3 which is displaceable in a longitudinal insertion direction 2 against springs (not shown in detail) in a known way on an insertion carriage 1. The catapult raster drawer also has two rigidly mounted, front clamp jaws 4 disposed opposite the back clamp jaw 3. In a standard way, the clamp jaws 4 respectively have clamp faces 5 and 6, which in a side-section are hook-shaped, that press against respective opposite side surfaces 7 and 8 of a cassette 9 and thereby simultaneously overlap the surfaces 7 and 8 to hold the cassette 9.

In accordance with the invention the front clamp jaws 4, in addition to the clamping faces 5 and 6, each have an additional stop face 10. The stop faces 10 face toward one another at an angle, preferably an angle of 45°, and are inclined relative to the longitudinal insertion direction 2. These stop faces 10 lie against adjoining lateral surfaces 11 of the cassette 9 and thus hold the cassette surfaces 11 in a position rotated by 45° relative to the normal holding position (shown in dashed lines) of a cassette 9'.

In order to make mounting even simpler, a small recess 12 that accepts the corner 13 of the cassette 9 can be provided in the middle of the clamp face 5 of the resiliently displaceable, back clamp jaw 3. Given an inexact positioning of the cassette in the position turned by 45°, this recess 12 prevents the corner of the cassette 9 received therein from sliding and thus eliminates any need for readjustment.

The invention is not limited to the illustrated exemplary embodiment. In a simplified embodiment, it would also be possible, for example, to fashion the central recess 12 of the back clamp jaw as a large V-shaped recess having two stop faces disposed at 90° relative to one another, so that the centered holding of the cassette 9 in the position turned by 45° relative to the normal holding position is achieved by these stop faces, and the side surfaces 11 would then simply lie against the rigid, front clamp jaws 4 at their corners.

Although modifications and changes may be suggested by those skilled in the art, it is the intention of the inventor to embody within the patent warranted hereon all changes and modifications as reasonably and properly come within the scope of his contribution to the art.

I claim as my invention:

1. A catapult raster drawer for a radiological examination system, said drawer comprising:

an insertion carriage;

a first clamp jaw and a second clamp jaw disposed opposite each other on said insertion carriage;

means for resiliently displacing at least one of said first and second clamp jaws relative to the other of said clamp jaws for clamping a cassette between said first and second clamp jaws, said clamp jaws each having first stop faces oriented for holding a cassette therebetween in a first position with edges of said cassette parallel to said first stop faces; and at least one of said first and second clamp jaws having a second stop face thereon, oriented at an angle relative to said first stop face, for holding said cassette in a second position rotated by said angle relative to said first position.

2. A catapult raster drawer as claimed in claim 1 wherein said angle is at least 45°.

3. A catapult raster drawer as claimed in claim 1 wherein said cassette is inserted into said drawer in an insertion direction, and wherein said first clamp jaw is disposed preceding said second clamp jaw in said insertion direction, and wherein said second clamp jaw has a central recess therein for receiving a corner of said cassette when said cassette is in said second position.

4. A catapult raster drawer as claimed in claim 1 wherein one of said clamp jaws comprises two spaced apart clamp elements, each of said clamp elements having a second stop face thereon oriented at said angle.

5. A catapult raster drawer as claimed in claim 1 wherein said cassette is inserted into said catapult raster drawer in an insertion direction and wherein said first clamp jaw precedes said second clamp jaw in said insertion direction, and wherein said first clamp jaw comprises said clamp jaw having said first and second clamp elements.

6. A catapult raster drawer as claimed in claim 1 wherein said cassette is inserted into said catapult raster drawer in an insertion direction, and wherein said first clamp jaw precedes said second clamp jaw in said insertion direction, and wherein said first clamp jaw is rigidly mounted on said insertion carriage.

* * * * *